United States Patent [19]
Sugata

[11] Patent Number: 5,333,066
[45] Date of Patent: Jul. 26, 1994

[54] IMAGE READING APPARATUS

[75] Inventor: Takeshi Sugata, Hikone, Japan

[73] Assignee: Dainippon Screen Mfg. Co., Ltd., Japan

[21] Appl. No.: 117,898

[22] Filed: Sep. 7, 1993

[30] Foreign Application Priority Data

Sep. 11, 1992 [JP] Japan .................... 4-243411

[51] Int. Cl.$^5$ .......................................... H04N 7/167
[52] U.S. Cl. ........................ 358/471; 358/474; 358/483; 250/208.1
[58] Field of Search ............. 358/471, 474, 482, 483, 358/496, 487, 213.11, 213.28, 101, 106; 355/244; 250/208.1; 350/5 A

[56] References Cited

U.S. PATENT DOCUMENTS

| | | | |
|---|---|---|---|
| 4,543,491 | 9/1985 | Tateoka | 250/578 |
| 4,870,505 | 9/1989 | Mitsuki | 358/494 |
| 4,922,087 | 5/1990 | Nakajima | 250/201.4 |
| 5,267,057 | 11/1993 | Sasada | 358/481 |
| 5,270,841 | 12/1993 | Watanabe | 358/496 |

Primary Examiner—Edward L. Coles, Sr.
Assistant Examiner—John Ning
Attorney, Agent, or Firm—Ostrolenk, Faber, Gerb & Soffen

[57] ABSTRACT

A scanner scans an original 6 divided into a plurality of regions in a main scanning direction reading image information. The scanner is equipped with light receiving units consisting of a plurality of CCDs arranged in the main scanning direction having a corresponding array of pixels that respond to an image of the original focused on the surface of the array by a plurality of lenses 12 arranged in the main scanning direction. A focal length f of the lens 12 satisfies the following formula, that is, $$f \geq (L_n \times y - n) \times P \times L_n \times \Delta / \{n \times (1 + P \times L_n)\}$$

where $L_n$ is the number of lines to be read, y is a length from an optic axis to the end of the region, P is a pitch between the solid-state imaging devices, n is allowable displacement in pixel number on the solid-state imaging devices, and $\Delta$ is displacement of the original 6 in the direction of the optic axis OA.

20 Claims, 4 Drawing Sheets

IMAGE READING APPARATUS

BACKGROUND OF THE INVENTION

The present invention relates to an image reading apparatus, and more specifically, it relates to an image reading apparatus for reading image information by scanning an original divided into a plurality of regions along a main scanning direction.

An image reading apparatus of a plane scanning type such as a scanner which scans an original divided into a plurality of regions along the main scanning direction to read image information. The image reading apparatus comprises an original retainer for retaining an original, a light source for irradiating the original with light, a plurality of CCDs (an example of a solid-state imaging device) which are arranged along the main scanning direction and having a corresponding array of pixels, and a plurality of lenses arranged along the main scanning direction for forming an image of the original on the solid-state imaging devices and which correspond respectively to the plurality of regions.

According to the above image reading apparatus, displacement of the original in the direction of its thickness (the direction of an optic axis) causes the image information to overlap or gap at a boundary of the regions to be read. In order to prevent the above problems, prior art teaches: use of a field lens for increasing a focal length, disposing it between lenses for forming an image of the original (Japanese Patent Publication 12062/1992); reduction of an angle of view on the boundary side of a region of adjacent regions (Japanese Patent Laid Open No. 11156/1983); or the provision of a displacement detecting means for detecting the direction of displacement of the original in the direction of the optic axis and the amount thereof (Japanese Patent Laid Open No. 109862/1991).

Conventional structures which provide for a field lens, complicates the optical system because the number of lens is increased. Consequently, the apparatus becomes expensive and adjustment of the optical system becomes complicated. Further, conventional structures in which the angle of view on the boundary side of the region is reduced also require a complicated adjustment because it is necessary to adjust positions of the CCDs in the main scanning direction in order to adjust the angle of view. In addition, conventional structures which provide a displacement detecting means, a displacement sensor such as a laser displacement sensor is necessary. The sensor makes the apparatus expensive and its adjustment is complicated.

SUMMARY OF THE INVENTION

One object of the present invention is to substantially prevent an image from overlapping and gapping inexpensively without any complicated adjustment.

An image readings apparatus of the present invention reads image information by scanning an original divided into a plurality of regions along a main scanning direction. The apparatus comprises an original retainer, a light source, solid-state imaging devices, and a plurality of lenses.

The original retainer retains the original. The light source irradiates the original with light. The plurality of solid-state imaging devices, capable of converting image information into pixels, are arranged in the main scanning direction. The plurality of lenses are arranged along the main scanning direction corresponding respectively to the plurality of regions and form an image of the original on the CCDs. The lenses has a focal length as follows:

$$f \geq (L_n \times y - n) \times P \times L_n / \{n \times (1 + P \times L_n)\}$$

Where $L_n$ is the number of lines to be read, y is a length from an optic axis to an end of the region, P is a pitch between solid-state imaging devices, n is allowable displacement in pixel number on the solid-state imaging devices, and $\Delta$ is displacement of the original in the direction of the optic axis.

In an image reading apparatus according to the aspect of the present invention, the light source irradiates the original on the original retainer with light, the light from the original is received by the solid-state imaging devices through the plurality of lenses, whereby image information is converted into pixels.

A lens with focal length f is set so as to satisfy the above formula, such that, even if the original is displaced in the direction of the optic axis, displacement on the solid-state imaging devices is within the allowable displacement n. Consequently, the image is substantially prevented from overlapping and gapping, accomplished inexpensively and without any complicated adjustment.

These and other objects and advantages of the present invention will be more apparent from the following detailed description.

DESCRIPTIONS OF THE PREFERRED EMBODIMENTS

Figure 1:
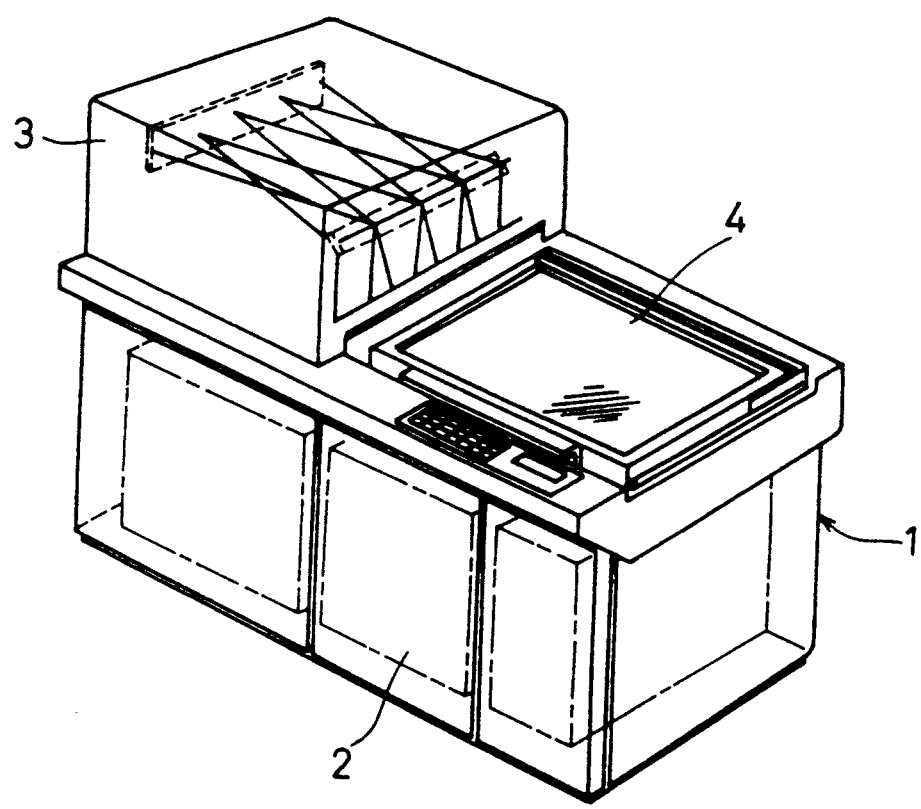
FIG. 1 is a schematic perspective view showing an image reading apparatus in accordance with an embodiment of the present invention.

FIG. 1 shows an image reading apparatus 1 (referred to as a scanner hereinafter) in accordance with an embodiment of the present invention. The scanner 1 comprises a lower frame 2, and an upper frame 3 disposed on the lower frame 2. An original retaining unit 4 is disposed on an upper surface of the lower frame 2.

Figure 2:
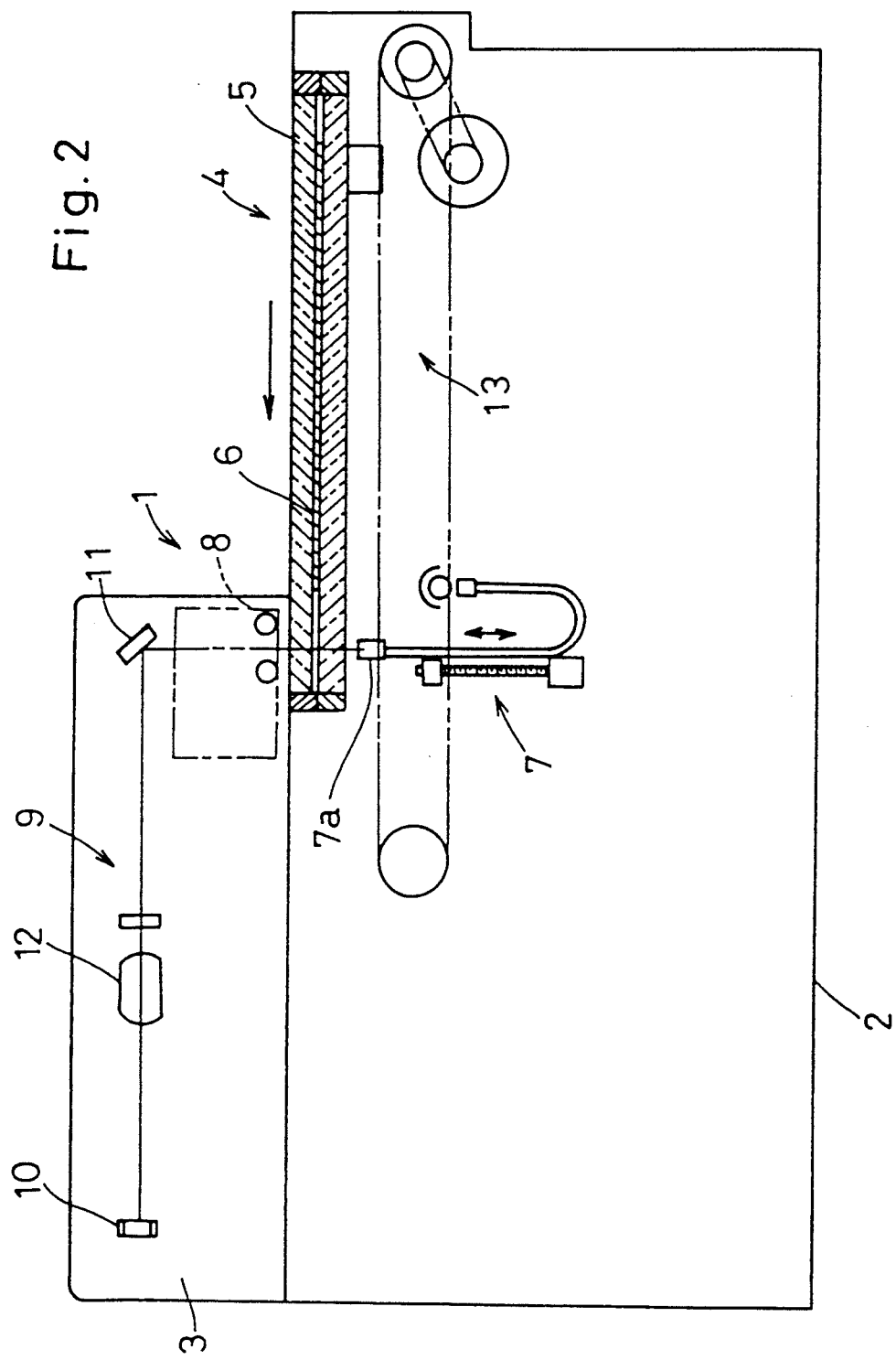
FIG. 2 is a schematic section view of the same.

Referring to FIG. 2, in the central portion of the lower frame 2, a light source 7 for transparency scanning which exposes a transparent original through a slit of a slitted member 7a is disposed under the original retaining unit 4 so as to be vertically movable. The original retaining apparatus 4 comprises an original retainer 5 movable in a sub-scanning direction shown by an arrow in FIG. 2 and a driving mechanism 13 for moving the original retainer 5. The original retainer 5 is capable of retaining an original 6 whose size is within 483 mm × 646 mm and holds the original 6 with a pair of upper and lower glass plates.

The upper frame 3 contains a light source 8 for reflection scanning which exposes a non-transparent original through a slit, an optical system 9 for producing image of the original, and four light receiving units 10 consisting of CCD line sensors. Each light receiving unit 10 consists of CCDs of 7500 pixels arranged in the main scanning direction (in the front-to-rear direction in FIG. 2). Thus, four light receiving units 10 read one line of the original 6 which is 483 mm in width in the main scanning direction by 30000 pixels.

Figure 3:
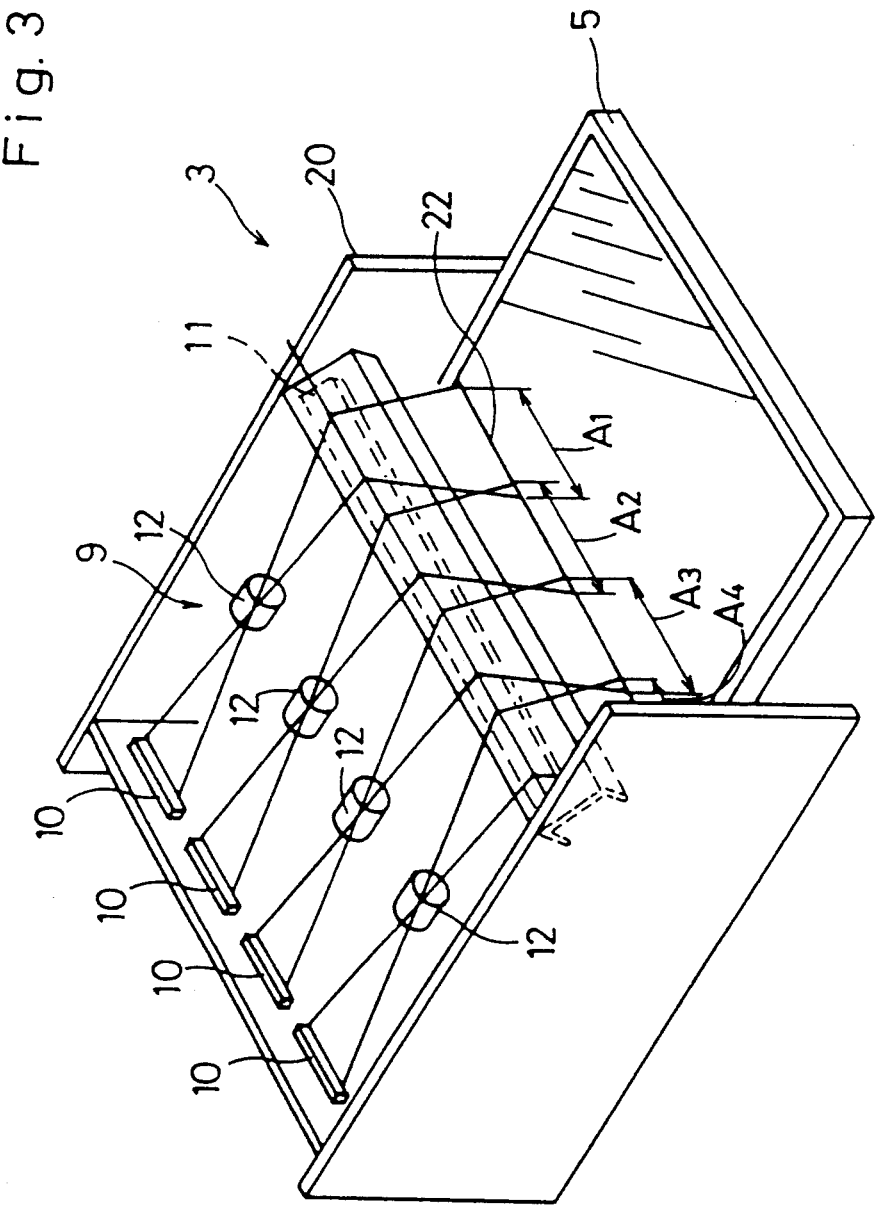
FIG. 3 is a schematic perspective view showing an upper frame.

Referring to FIG. 3, the optical system 9 comprises a reflecting mirror 11 for refracting the light from the original 6 by 90° in the horizontal direction, and lenses 12 for forming an image of the original 6 on the light receiving units 10. Four lenses 12 are arranged in the main scanning direction corresponding to the light receiving units 10. The lenses 12 are disposed so as to be able to form the image of the original in four regions $A_1$ to $A_4$ on the light receiving units 10 on the image reading line 22 which extends in the main scanning direction on the original retainer 5. Adjacent regions of the regions $A_1$ to $A_4$ overlap each other.

A focal length f of the lens 12 is as follows, that is, $$f \geq (L_n \times y - n) \times P \times L_n \times \Delta / \{n \times (1 + P \times L_n)\}$$

The reason will be described hereinafter.

Figure 4:
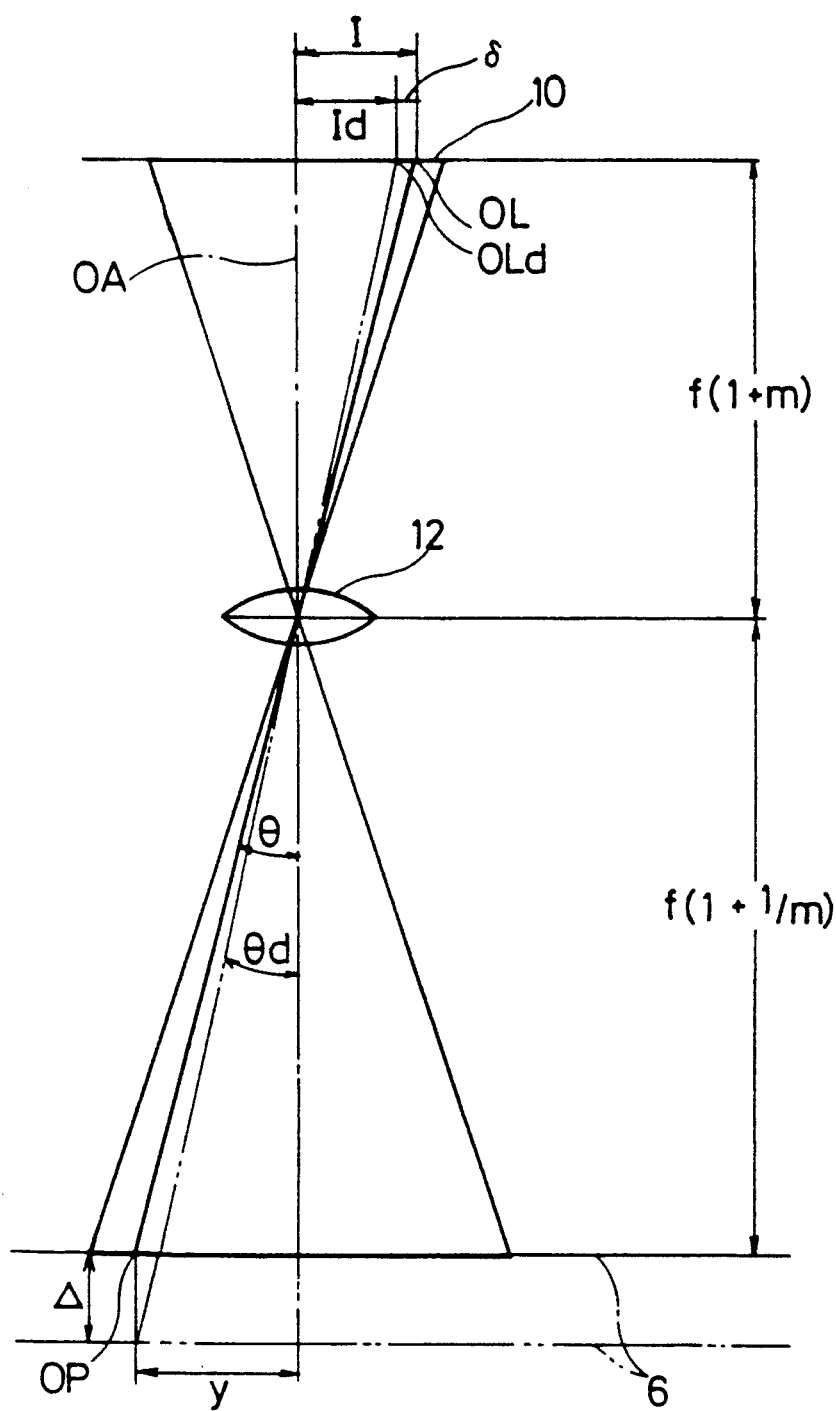
FIG. 4 is a schematic plan view showing an optical system.

Referring to FIG. 4, if it is assumed that y is a distance from an optic axis OA to an observation point OP on the original surface of the original 6, $\Delta$ is displacement of the original 6 in the direction of the optic axis, f is a focal length of the lens 12, m is magnification of the optical system 9, $\delta$ is displacement of the image on an image surface of the light receiving unit 10 when the original 6 is displaced in the direction of the optic axis, $l$ is a distance between the optic axis OA and the image OL of the observation point OP on the light receiving unit 10 when the original 6 is not displaced in the direction of the optic axis, $l_d$ is a distance between the optic axis OA and the image $OL_d$ of the observation point OP when the original 6 is displaced in the direction of the optic axis, $\theta$ is an angle formed with a main beam and the optic axis OA when the original 6 is not displaced, and $\theta_d$ is an angle formed with the main beam and the optic axis OA when the original 6 is displaced, the following formulas are provided, that is, $$y = f \times (1 + 1/m) \times \tan \theta$$

therefore, $$\tan \theta = y / \{f \times (1 + 1/m)\} \quad (1)$$

In addition, $$y = \{f \times (1 + 1/m) + \Delta\} \times \tan \theta_d$$

therefore, $$\tan \theta_d = y / \{f \times (1 + 1/m) + \Delta\} \quad (2)$$

$$l = f \times (1 + m) \times \tan \theta \quad (3)$$

$$l_d = f \times (1 + m) \times \tan \theta_d \quad (4)$$

The following formula is derived from the above formulas (1), (2), (3) and (4).

$$\delta = l_d - l \quad (5)$$

$$= f \times (1 + m) \times \frac{y}{f \times (1 + 1/m)} -$$

$$f \times (1 + m) \times \frac{y}{f \times (1 + 1/m) + \Delta}$$

$$= y \times f(1 + m) \times$$

$$\left\{ \frac{1}{f \times (1 + 1/m)} - \frac{1}{f \times (1 + 1/m) + \Delta} \right\}$$

$$= y \times \frac{f \times (1 + m)}{f \times (1 + 1/m)} \times \frac{\Delta}{f \times (1 + 1/m) + \Delta}$$

$$= y \times m \times \frac{\Delta}{f \times (1 + 1/m) + \Delta}$$

$$= \frac{\Delta + m}{f \times (1 + 1/m) + \Delta} \times y$$

$$= \frac{\pm \Delta \times m^2}{f + m \times \Delta + f \times m} \times y$$

Therefore, $$\delta = \Delta \times m^2 \times y / (f + m \times \Delta + f \times m)$$

In order to keep the displacement $\delta$ within n pixels of the CCDs of the light receiving unit 10, the following formula has to be satisfied, that is, $$\delta / P \leq n$$

where P is a pixel pitch (mm) between the CCDs. Therefore, $$\Delta \times m^2 \times y / \{P \times (f + m \times \Delta + f \times m)\} \leq n$$

The above formula is transformed as follows.

$$\Delta \times m^2 \times y \leq n \times P \times (f + m \times \Delta + f \times m)$$

$$\Delta \times m \times (m \times y - n \times P) \leq n \times P \times f \times (1 + m)$$

Therefore, $$f \geq \Delta \times m \times (m \times y - n \times P) / \{n \times P \times (1 + m)\} \quad (6)$$

$$n = P \times L_n \quad (7)$$

where $L_n$ is a linear density per unit length (lines/mm).

The following formula is provided from the above formulas (6) and (7), that is, $$f \geq (L_n \times y - n) \times P \times L_n \times \Delta / \{n \times (1 + P \times L_n)\} \quad (8)$$

When the focal length f of the lens is decided so as to satisfy the formula (8), if the original is displaced by $\Delta$ in the optic axis direction, the displacement $\delta$ of the image OL on the CCDs of the light receiving units 10 is within the allowable displacement n in pixel number. Therefore, the image is prevented from overlapping and gapping at the boundary of the regions where the plurality of lenses form the image; accomplished inexpensively without any complicated adjustment.

Then, an operation of the above embodiment of the present invention will be described.

The original 6 is set on the original retainer 5 and an operator indicates scanning start, the light source 7 or 8 is turned on and the original retainer 5 is moved in the horizontal direction (sub-scanning direction) in FIG. 2 to start the scanning. Then, light which the original 6 transmitted or reflected is reflected by the reflecting mirror 11 in the horizontal direction and then applied to the lenses 12. The light applied to the lenses 12 forms an image on the light receiving units 10 and then the image is converted to electric signals.

In this case, even if the original 6 is displaced by Δ in the optic axis direction, the displacement δ of the image on the light receiving units 10 is within the allowable displacement n. Consequently, even if the original 6 is displaced in the optic axis direction in the boundary region of the light receiving unit 10, the image information is substantially prevented from overlapping and gapping.

For example, when the original which is 483 mm in width along the main scanning direction is scanned, If the light receiving unit 10 is formed of CCDs of 7500 pixels, the linear density $L_n$ per unit length which shows resolution is 59.1 lines/mm, the pixel pitch P is 7 μm, the distance y between the optic axis and the observation point is 63.5 mm and the displacement Δ of the original 6 in the optic axis direction is 1 mm, the focal length f of the lens 12 is set so as to satisfy the following formula.

$$f \geq (3750-n) \times 0.41339/(1.41339\ n) \qquad (9)$$

Referring to the allowable displacement n, in a case of Ming type of 5th grade character, it is found from experience that it may be within 10 pixels when a connecting operation is performed between image-formed regions, or it may be within 4 pixels when the connecting operation is not performed between the image-formed regions. Therefore, the equation, n=10 is substituted for the above formula (9), the focal length f has to be more than 109.4 mm when the connecting operation is performed. If the equation, n=4 is substituted, the focal length f has to be more than 276.3 mm when the connecting operation is not performed.

Modifications

The number of lenses is not limited to four and the present invention is implemented if the number is the plural.

For example, when the original of A0 size (920 mm in width) is read by an optical system using two lenses and two light receiving units, if each light receiving unit is formed of CCDs of 7900 pixels, a linear density per unit length is 15.7 lines/mm, the pixel pitch P is 7 μm, the distance between the optical axis and the observation point is 232 mm, and the allowable displacement is 10, the focal length f has to be more than 36.0 mm.

Various details of the invention may be changed without departing from its spirit or its scope. Furthermore, the foregoing description of the embodiments according to the present invention is provided for the purpose of illustration only, and not for the purpose of limiting the invention as defined by the appended claims and their equivalents.

What is claimed is:

1. An image reading apparatus for reading image information by scanning an original divided into a plurality of regions in a main scanning direction, comprising:
    an original retainer for retaining said original;
    a light source for irradiating said original with light;
    a plurality of solid-state imaging devices corresponding to pixels and arranged in said main scanning direction; and
    a plurality of lenses arranged in said main scanning direction corresponding to said plurality of regions, for forming an image of the original on said solid-state imaging devices, and with a focal length f of said lens satisfying the following formula, that is, $$f \geq (L_n \times y - n) \times P \times L_n \times \Delta / \{n \times (1 + P \times L_n)\}$$

where $L_n$ is the number of lines to be read, y is a length from an optic axis to the end of said region, P is a pitch between said solid-state imaging devices, n is allowable displacement in pixel number on said solid-state imaging devices, and Δ is displacement of said original in the direction of the optic axis.

2. An apparatus according to claim 1, wherein adjacent regions of said plurality of regions overlap each other.

3. An apparatus according to claim 2, wherein said solid-state imaging devices are CCD line sensors.

4. An apparatus according to claim 3, further comprising a reflecting mirror for refracting light from the original to said plurality of lenses.

5. An apparatus according to claim 4, wherein said original retainer is movable in a sub-scanning direction which is perpendicular to said main scanning direction.

6. An apparatus according to claim 5, further comprising a driving mechanism for moving said original retainer.

7. An apparatus according to claim 6, wherein said original retainer has an upper and a lower glass plate to hold the original therebetween.

8. An apparatus according to claim 7, wherein said light source is disposed under said original retainer.

9. An apparatus according to claim 8, wherein said light source is movable in its irradiating direction.

10. An apparatus according to claim 9, wherein said light source comprises a slitted member having a slit through which said light source exposes a transparent original.

11. An apparatus according to claim 10, further comprising a second light source for reflection scanning disposed above said original retainer to expose a non-transparent original.

12. An apparatus according to claim 11, wherein said CCD line sensors read one line of said original by 30000 pixels in the main scanning direction.

13. An apparatus according to claim 1, further comprising a reflecting mirror for refracting light from the original to said plurality of lenses.

14. An apparatus according to claim 1, wherein said original retainer is movable in a sub-scanning direction which is perpendicular to said main direction.

15. An apparatus according to claim 14, further comprising a driving mechanism for moving said original retainer.

16. An apparatus according to claim 15, wherein said original retainer has an upper and a lower glass plate to hold the original therebetween.

17. An apparatus according to claim 1, wherein said light source is disposed under said original retainer.

18. An apparatus according to claim 17, wherein said light source is movable in its irradiating direction.

19. An apparatus according to claim 18, wherein said light source comprises a slitted member having a slit through which said light source exposes a transparent original.

20. An apparatus according to claim 1, further comprising a second light source for reflection scanning disposed above said original retainer, to expose a non-transparent original.

* * * * *